United States Patent

[11] 3,595,153

[72] Inventor Ivar Saul
  Portland, Oreg.
[21] Appl. No. 845,354
[22] Filed July 28, 1969
[45] Patented July 27, 1971
[73] Assignee Tektronix Inc.
  Beaverton, Oreg.

[54] ELECTRICALLY OPERATED SHUTTER
7 Claims, 4 Drawing Figs.
[52] U.S. Cl................................................. 95/53,
  95/63, 95/64
[51] Int. Cl....................................................... G03b 9/24
[50] Field of Search............................................ 95/53 R,
  63, 53 E, 64 R, 64 C

[56] References Cited
UNITED STATES PATENTS
3,466,993 9/1969 Fahlenberg et al. .......... 95/63

Primary Examiner—Samuel S. Matthews
Assistant Examiner—Richard L. Moses
Attorney—Buckhorn, Blore, Klarquist and Sparkman ABSTRACT: A camera shutter, actuated to its open position by an electrically operated solenoid, provides a settable aperture opening. The stroke of the solenoid mechanism is constant for opening and closing the shutter, and an actuator arm between the solenoid and the shutter drive ring is rotatable upon an adjustable cam operated pivot for predetermining the shutter-open aperture. A second solenoid is employed for closing the shutter, while detent means holds the shutter in either open or closed position.

IVAR SAUL
INVENTOR
BY
BUCKHORN, BLORE, KLARQUIST & SPARKMAN
ATTORNEYS

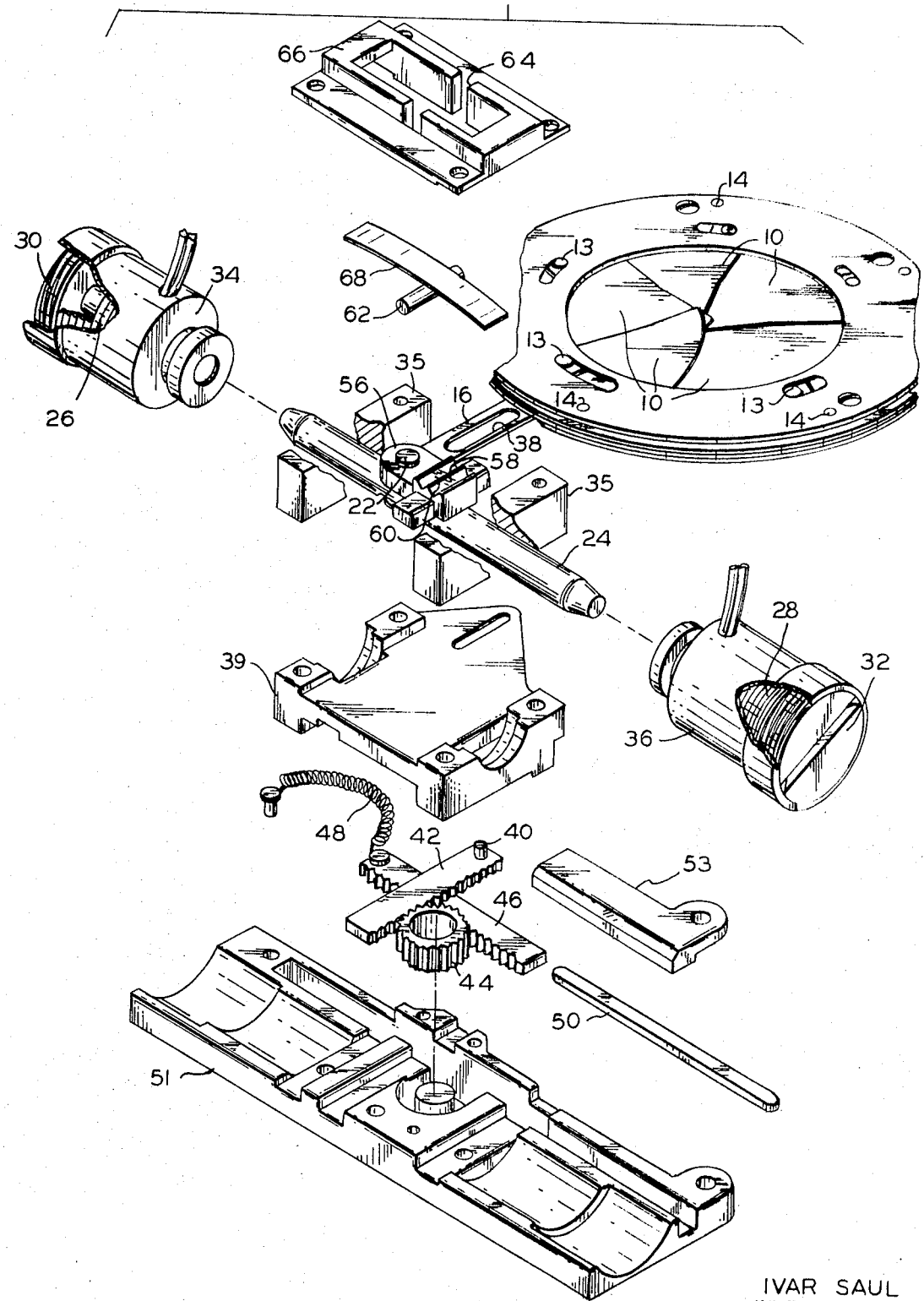

ELECTRICALLY OPERATED SHUTTER

BACKGROUND OF THE INVENTION

Heretofore, electrically operated shutters of the diaphragm type have employed a variable stroke electromagnetic or solenoid for actuating the same. In response to the variable stroke of a solenoid plunger, the shutter is opened to a predetermined aperture consonant with the amount of light available and the shutter speed. However, it is difficult to adjust the stroke of a solenoid to the accuracy required in predetermining the aperture opening. Also, when a solenoid plunger is allowed to go only part of a stroke, somewhat limited holding power and operating power may be available, particularly at extremes of adjustment.

SUMMARY OF THE INVENTION

According to the present invention, an electrically operated shutter employs electromagnetic means which operates full stroke, while at the same time providing an adjustable aperture for the shutter in the open position. The shutter employs a plurality of blades and a drive ring therefor, and the latter is operated by a rotatable actuator arm. The actuator arm is connected from the drive ring to the electromagnetic means, while being adjustable pivoted at a point therebetween in accordance with the desired aperture opening set by an *f*-stop control cam. The electromagnetic means preferably includes a pair of pulse operated solenoids employing a common solenoid plunger pivotally connected to the aforementioned actuator arm for respectively opening and closing the shutter. A detent is provided along the plunger between the solenoids for yieldably holding the solenoid plunger in open or closed position. Set screws on the outside ends of the solenoids adjust the stroke of the solenoid plunger.

The *f*-stop control cams operates cam follower means including a double rack and pinion mechanism for positioning an adjustable actuator arm pivot. A first rack is moved longitudinally in a first direction by a cam follower, and this first rack engages a pinion. The pinion also engages a second rack disposed at approximately 90° to the first, and upon which the adjustable actuator arm pivot is located.

It is an object of the present invention to provide an improved electrically operated and adjustable aperture shutter operated by electromagnetic means wherein said electromagnetic means employs a constant stroke movement in response to electrical energization for various adjustable aperture openings.

It is a further object of the present invention to provide an improved electrically actuated and adjustable aperture shutter which is accurate and certain in operation.

It is another object of the present invention to provide a pulse operated bistable shutter having an adjustable aperture opening which may be driven open by one pulse and which draws no power until the second pulse is employed to close the shutter.

It is a further object of the present invention to provide an economically constructed, electrically operated and adjustable shutter mechanism which is easily adjusted to accurate aperture openings.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 3 is an exploded view of the electrically operated shutter mechanism in accordance with the present invention.

DETAILED DESCRIPTION

Figure 1:
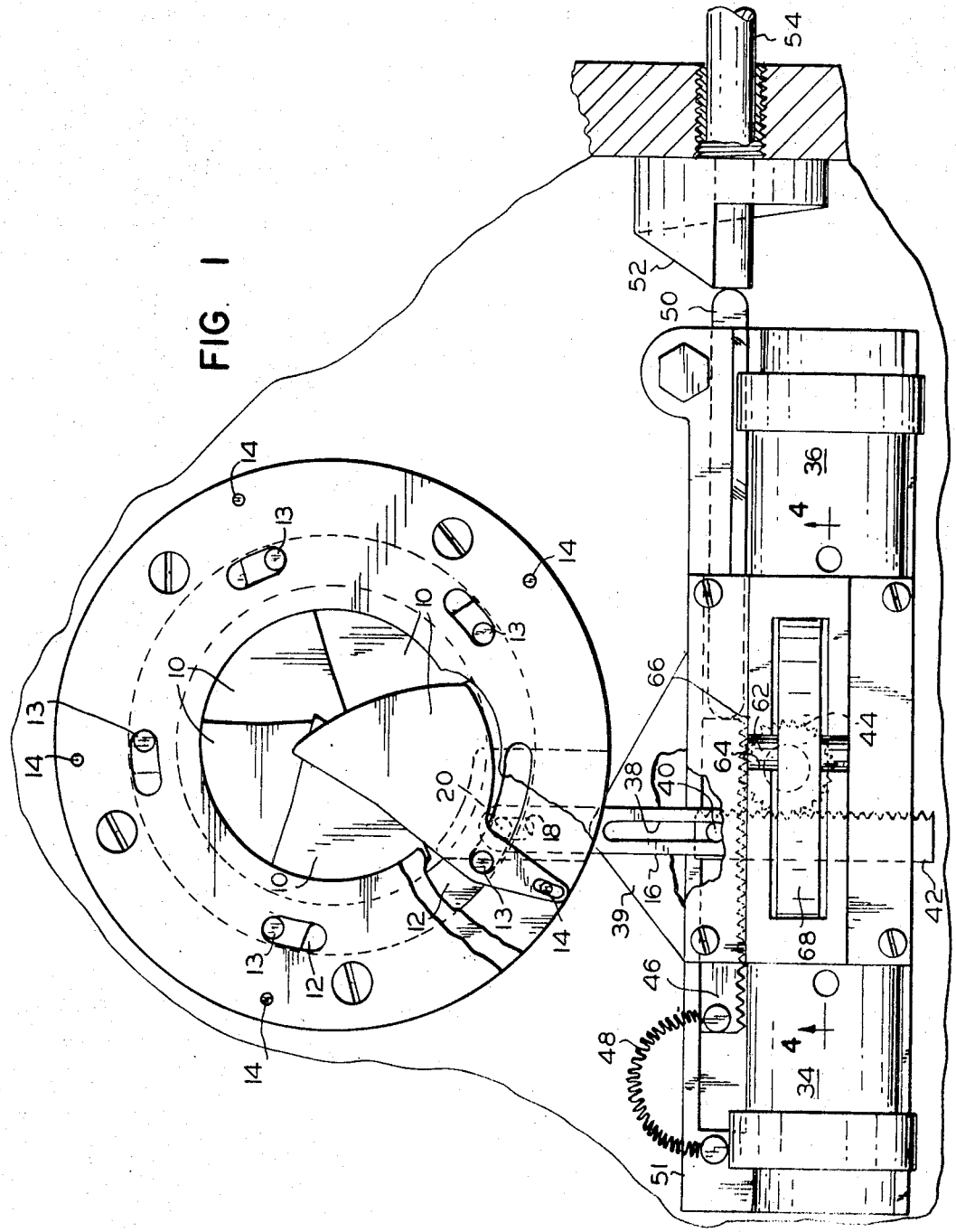
FIG. 1 is an elevational view of an electrically operated shutter mechanism in accordance with the present invention.

Referring to the drawings, the shutter according to the present invention includes a plurality of blades 10 surrounded by a drive ring 12 and pivotally connected thereto in the usual manner so that rotation of drive ring 12 in one direction is effective to open shutter blades 10, while rotation thereof in the opposite direction is effective to close shutter blades 10. In the position shown in FIG. 1, the shutter blades are closed, and rotation of drive ring 12 in a counterclockwise direction is effective to open the shutter blades to a position illustrated in FIG. 2. Pins 13 mounted on the drive ring engage the shutter blades for turning the shutter blades in the clockwise direction around pivots 14 in order to open the same.

Drive ring 12 is operated for opening and closing the shutter blades by means of a rotational actuator arm 16 having a slot 18 engaging shutter drive pin 20 on drive ring 12. At its opposite end, actuator arm 16 is rotatably connected to pin 22 mounted upon plunger 24. Plunger 24 comprises the movable member of electromagnetic means comprising aligned solenoids 26 and 28 which are respectively operated to open and close the shutter. Actuator arm 16 is connected to plunger 24 between the solenoids. Plunger 24 is common to both solenoids and always executes substantially the same stroke between open and closed positions. As a result, the solenoids are able to exert constant actuating and engaging power than is the solenoids were allowed to move the plunger over only a partial stroke. The length of stroke is preliminarily adjusted by means of set screws 30 and 32 having shank portions which extend into solenoids 26 and 28 respectively for receiving the tapered ends of plunger 24 in respective open and closed positions of the shutter. Set screw 30 is threadably received in the outer end of housing 34 for solenoid 26, while set screw 32 is threadedly received in the outer end of the housing 36 for solenoid 28. Housings 34 and 36 are clamped to base 51 by means of blocks 35 and 39.

Between the plunger 24 and drive ring 12, actuator arm 16 is provided with a slot 38 for receiving adjustable pivot 40. Thus, when plunger 24 is moved in either direction, actuator arm 16 rotates about adjustable pivot 40, and the upper end of the actuator arm rotates drive ring 12 through an angle determined by the location of adjustable pivot 40. Pivot 40 is mounted upon a rack 42 having teeth engaging pinion 44. Pinion 44 also engages the teeth of a rack 46 disposed at approximately a 90° angle to rack 42. A spring 48 is designed for urging rack 46 to the right in the drawing, with approximately a constant force, against cam follower 50 which is longitudinally aligned with rack 46 in end-abutting relationship. Cam follower 50 is urged by spring 48 against end cam 52 rotatable with shaft 54 by means of a dial adjustment and/or computer adjustment employed for setting the aperture opening of the shutter. The cam follower 50 together with racks 42 and 46 and pinion 44 may be considered as part of cam follower means employed for positioning adjustable pivot 40 in response to the rotational position of cam 52. These elements are positioned for movement in base 51. Cam follower 50 is held in place by cover 53. The rack and pinion mechanism is found efficacious in accurately transmitting the aperture setting from the location of cam 52 to the location of pivot 40.

The cam 52 may be a continuous cylindrical cam, or it may be provided with steps for various *f*-step settings. Cam 52 is desirably formed of plastic material, and is replaceable in the mechanism for thereby providing the predetermined range of shutter aperture openings.

It will be seen that for a given position of cam 52, adjustable pivot 40 will be located in a position along slot 38 determined thereby. The position of adjustable pivot 40, in turn, determines the extent to which the shutter blade open in their open position. A first aperture opening is illustrated in full line in FIG. 2, while a second, smaller aperture opening for a second and higher position of pivot 40 is illustrated in phantom. The position of pivot 40 changes the ratio between the total plunger travel and the movement of the shutter drive. In open position, the shutter blades provide an aperture having the approximate shape of a pentagon, the size of which responds closely to the rotation of cam 52.

Figure 2:
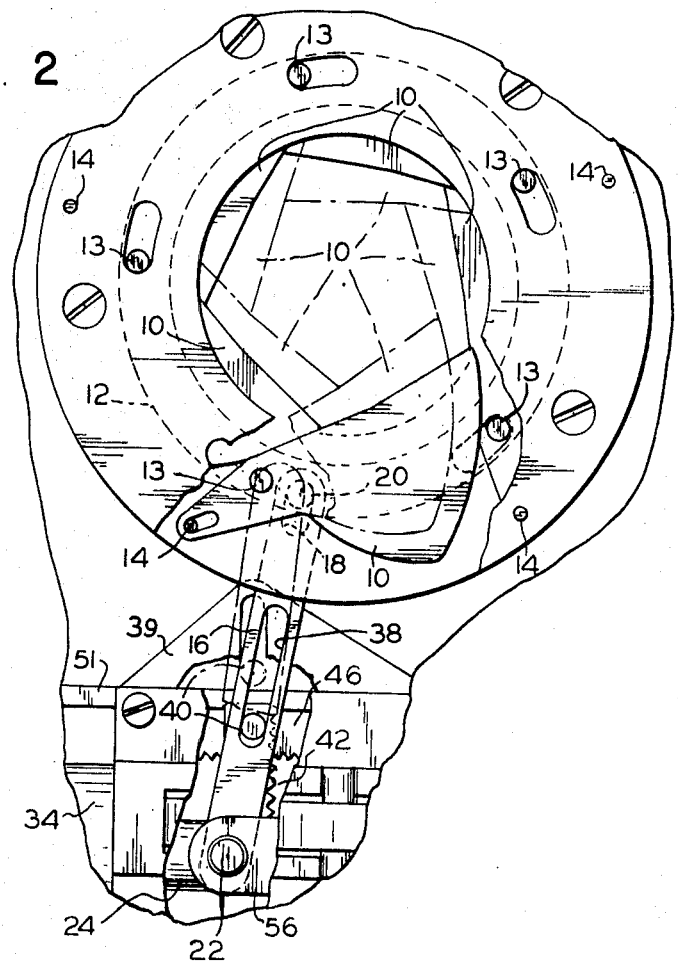
FIG. 2 is a partial elevational view of the same shutter mechanism in the shutter-open condition illustrating different light apertures.

The apparatus illustrated in FIG. 1 is generally located in a vertical plane with shutter blades 10, and the rack and pinion apparatus provides an accurate means for receiving information from a computer desirably located alongside the present mechanism in line with cam shaft 54. The mechanism is found effective to control the equivalent iris diameter for the shutter in its open position within a plus or minus ten percent of the equivalent diameter of light desired.

It will be noted that actuator arm 16 in the closed position of the shutter is substantially parallel to rack 42. Set screw 32 is desirably adjusted until members 16 and 42 are in fact parallel. Thus, movement of cam 52 when the shutter is in closed position moves adjustable pivot 40 along slot 38 without changing the position of the shutter blades. However, when solenoid 26 is operated for drawing plunger 24 to the left against set screw 30, the position of adjustable pivot 40 selected by cam 52 will determine the angular movement of the end of the actuator arm 16 connected to drive ring 12.

Solenoids 26 and 28 are desirably operated by short pulses of current for rapidly moving the shutter from closed to open position, and vice versa. In this mode of operation, it is of additional importance that plunger 24 be able to respond completely and rapidly with a full stroke. In the present construction, the plunger always travels the same predetermined distance, and may be accurately positioned so as to be responsive to the short burst of current which may be provided. The solenoids are deenergized between pulses.

Figure 4:
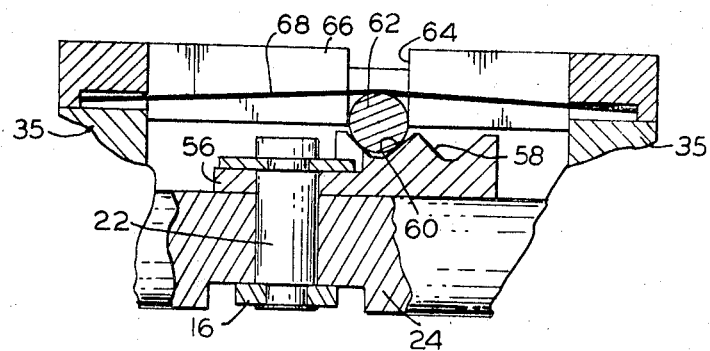
FIG. 4 is a view taken at 4—4 in FIG. 1 illustrating latch means according to the present invention.

When the solenoids 26 and 28 are pulse operated in the aforementioned manner, means are also desirably provided for holding the shutter in either the open or closed position between pulses applied to the respective solenoids. For this purpose, the apparatus includes a latch means as seen in FIG. 3, and as particularly illustrated in FIG. 4. This mechanism includes a detent block 56 provided with a top portion having a pair of lateral grooves 58 and 60. The block 56 is secured to plunger 24 between solenoids 26 and 28 by means of pin 22 whereby block 56 is driven between its two detent positions by the full stroke of plunger 24. In the position shown in FIGS. 3 and 4, corresponding to the shutter-closed condition, a lateral pin 62 engages slot 60. Pin 62 is positioned for perpendicular movement in a slot 64 provided in mounting member 66. A leaf spring 68, secured by member 66, urges pin 62 toward grooves 58 and 60 for holding plunger 24 in one of its two longitudinal positions. Thus, when solenoid 26 is energized by a pulse of current for opening the shutter, groove 58 moves under pin 62, and the latter holds the shutter in an open position until a pulse is delivered to solenoid 28 for closing the shutter again, returning the mechanism to its position as illustrated in FIG. 4. The period between open and closing pulses determines the shutter speed, and this time may be quite short or may be extended as desired for a longer exposure time. The time may be coordinated by computer means (not shown), in conjunction with the positioning of cam 52, for providing the proper exposure.

While I have shown and described a preferred embodiment of my invention, it will be apparent to those skilled in the art that many changes and modifications may be made without departing from my invention in its broader aspects.

I claim:
1. An electrically operated shutter comprising:
   a drive ring and a plurality of blades positioned therewithin and pivotally connected to said drive ring for opening and closing in response to rotation of said drive ring,
   an actuator arm rotatably connected to said drive ring for opening and closing said blades as said actuator arm rotates said drive ring,
   electromagnetic means for operating said actuator arm through predetermined angles of rotation, said electromagnetic means having a given stroke for imparting a predetermined linear motion to a portion of said actuator arm,
   an adjustable pivot for said actuator arm located between said electromagnetic means and said drive ring and about which said actuator arm pivots,
   a cam for adjusting the aperture of said shutter,
   and cam follower means for positioning said adjustable pivot in response to the position of said cam, the position of said adjustable pivot determining the amount of rotation of said drive ring when said actuator arm is operated by said electromagnetic means for in turn determining the aperture opening of said shutter.

2. The shutter according to claim 1 wherein said electromagnetic means is provided with a latch means for yieldably holding said electromagnetic means alternately in positions corresponding to reverse ends of the stroke thereof and to closed and open positions of said shutter.

3. The shutter according to claim 2 wherein said electromagnetic means comprises a pair of solenoids with a common plunger pivotally connected to said actuator arm, and wherein said latch means comprises a detent for engaging said actuator arm in opposite stroke positions thereof.

4. The shutter according to claim 1 wherein said cam follower means includes a cam follower engaging said cam, a first rack in line with said cam follower and imparted linear motion from said cam follower, a pinion engaging said first rack, and a second rack also engaging said pinion, said second rack supporting said adjustable pivot.

5. The shutter according to claim 4 wherein said first and second racks are disposed at substantially 90° to one another.

6. The shutter according to claim 1 wherein said actuator arm is provided with a slot along which said adjustable pivot is movable by said cam follower means.

7. The shutter according to claim 3 wherein said solenoids are positioned in line, and said plunger is pivotally connected to said actuator arm therebetween, with said detent also being located between said solenoids, each of said solenoids having a set screws at the end thereof opposite from said actuator arm, wherein said set screw is adjustable for limiting the length of stroke of said plunger for preliminary adjusting said shutter.